US 12,431,555 B2

(12) United States Patent
Zhao et al.

(10) Patent No.: US 12,431,555 B2
(45) Date of Patent: Sep. 30, 2025

(54) HEATING CIRCUIT FOR BATTERY, CONTROL METHOD THEREFOR, BATTERY, AND ELECTRIC VEHICLE (71) Applicant: CONTEMPORARY AMPEREX TECHNOLOGY (HONG KONG) LIMITED, Hong Kong (CN)

(72) Inventors: Yuanmiao Zhao, Ningde (CN); Zhanliang Li, Ningde (CN); Zhimin Dan, Ningde (CN); Xiaojian Huang, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 189 days.

(21) Appl. No.: 18/446,351

(22) Filed: Aug. 8, 2023

(65) Prior Publication Data
US 2023/0395890 A1    Dec. 7, 2023

Related U.S. Application Data

(63) Continuation of application No. PCT/CN2021/130716, filed on Nov. 15, 2021.

(51) Int. Cl.
*H01M 10/615* (2014.01)
*H01M 10/44* (2006.01)
(Continued)

(52) U.S. Cl.
CPC ....... *H01M 10/615* (2015.04); *H01M 10/443* (2013.01); *H01M 10/625* (2015.04); *H01M 10/63* (2015.04); *H01M 2220/20* (2013.01)

(58) Field of Classification Search
CPC ... H01M 10/443; H01M 10/615; H01M 10/63
See application file for complete search history.

(56) References Cited

U.S. PATENT DOCUMENTS

2011/0144861 A1   6/2011   Lakirovich et al.
2013/0127398 A1   5/2013   Xu et al.
2021/0075073 A1   3/2021   Hou et al.

FOREIGN PATENT DOCUMENTS

| CN | 108879027 A | 11/2018 |
| CN | 109301366 A | 2/2019 |

(Continued)

OTHER PUBLICATIONS

International Search Report for International Application PCT/CN2021/130716, mailed Aug. 11, 2022.
(Continued)

*Primary Examiner* — Jonathan G Jelsma
(74) *Attorney, Agent, or Firm* — Ladas & Parry LLP (57) ABSTRACT

A heating circuit for a battery, a control method therefor, a battery, and an electric vehicle are provided. The battery includes a first battery bank and a second battery bank, and the heating circuit includes a switch module, a heating module, and a control module. The switch module is connected to each of the first battery bank and the second battery bank. The heating module is connected to each of the first battery bank, the second battery bank, and the switch module. The control module is connected to each of the switch module and the heating module. The control module is configured to control the switch module to switch the battery to a heating state, and is configured to control the heating module when the battery is in the heating state, such that the first battery bank, the heating module, and the second battery bank form a loop.

18 Claims, 3 Drawing Sheets

(51) Int. Cl.
*H01M 10/625* (2014.01)
*H01M 10/63* (2014.01)

(56) References Cited

FOREIGN PATENT DOCUMENTS

| | | | |
|---|---|---|---|
| CN | 110116653 | A | 8/2019 |
| CN | 110970690 | A | 4/2020 |
| CN | 112224092 | A | 1/2021 |
| CN | 108878996 | B | 3/2021 |
| EP | 3758127 | A1 | 12/2020 |
| WO | 2020135733 | A1 | 7/2020 |

OTHER PUBLICATIONS

Extended European Search Report for EP application No. 21963716.2, dated Feb. 24, 2025, 7 pages.
First Office Action of CN application No. 202180039329.7, dated May 28, 2025.

HEATING CIRCUIT FOR BATTERY, CONTROL METHOD THEREFOR, BATTERY, AND ELECTRIC VEHICLE

CROSS REFERENCE TO RELATED APPLICATION

This application is a continuation of International Patent Application No. PCT/CN2021/130716, filed on Nov. 15, 2021, which is incorporated by reference in its entirety.

TECHNICAL FIELD

The present application relates to the field of battery technologies, and in particular, to a heating circuit for a battery, a control method therefor, a battery, and an electric vehicle.

BACKGROUND

With the increasingly severe energy and environmental problems, the country's strong support for new energy, and the increasingly mature power battery technologies, electric vehicles have become a new direction for the development of the automotive industry in the future. Endurance mileages of electric vehicles have become an important factor that affects the popularity of electric vehicles. Batteries, as a key component, are the main power source for electric vehicles, and the stability and reliability of product quality of batteries are crucial.

However, the usage of batteries in a low temperature environment is limited to some extent. Specifically, discharge capacities of batteries significantly decrease in a low temperature environment, and batteries cannot be charged in the low temperature environment. Therefore, to use batteries normally, batteries need to be heatable.

In the prior art, an external high-voltage circuit of a battery usually needs to be used to rapidly switch the battery between charging and discharging, so as to implement a heating process of the battery. In this manner, the external high-voltage circuit is usually provided with an energy storage unit for providing charging and discharging currents. However, in practical applications, the energy storage unit can only provide limited charging and discharging currents, resulting in a slow heating rate of the battery.

SUMMARY

The present application aims to provide a heating circuit for a battery, a control method therefor, a battery, and an electric vehicle, which can increase a heating rate of the battery. To achieve the above purpose, according to a first aspect, the present application provides a heating circuit for a battery. A battery includes a first battery bank and a second battery bank, and the heating circuit for a battery includes a switch module, a heating module, and a control module. The switch module is connected to each of the first battery bank and the second battery bank, the heating module is connected to each of the first battery bank, the second battery bank, and the switch module, and the control module is connected to each of the switch module and the heating module. The control module is configured to control the switch module to switch the battery to a heating state, and is configured to control the heating module when the battery is in the heating state, such that the first battery bank, the heating module, and the second battery bank form a loop. The loop is used to transfer electricity between the first battery bank and the second battery bank, so as to heat the first battery bank and the second battery bank.

When the battery needs to be heated, the battery can be switched to the heating state through the switch module, so that the first battery bank and the second battery bank can be separated into two independent battery banks. Then, the first battery bank, the heating module, and the second battery bank form a loop. In the loop, the first battery bank can discharge towards the second battery bank through the heating module, and the second battery bank can also discharge towards the first battery bank through the heating module, so as to heat the first battery bank and the second battery bank. Therefore, there is no need to supply power with an external high-voltage circuit as in the related art, that is, a current between the first battery bank and the second battery bank is not limited by an energy storage unit, so that the current between the first battery bank and the second battery bank can be controlled to be increased to increase the heating rate of the battery. Besides, the first battery bank and the second battery bank can be heated simultaneously, which can also help to increase the heating rate of the battery. In addition, because the current flows only between the first battery bank and the second battery bank, connecting wires between electronic elements only exist inside the battery. However, in the related art, because a high-voltage circuit needs to be provided outside the battery, connecting wires thereof need to be connected to the battery from the external high-voltage circuit. Generally, the connecting wires connected to the battery from the outside are longer than the connecting wires inside the battery. That is, compared to the solution of providing a high-voltage circuit outside the battery in the related art, the connecting wires required in the present application are shorter, which can reduce the current loss on the connecting wires and help to improve heating efficiency.

In an optional manner, the switch module includes a first switch and a second switch. The first battery bank, the first switch, and the second battery bank are connected in series to form a first branch, a first terminal of the first branch is connected to the heating module, a second terminal of the first branch is connected to each of a first terminal of the second switch and the heating module, a connecting point between the first battery bank and the first switch is connected to a second terminal of the second switch, and a connecting point between the second battery bank and the first switch is connected to the heating module.

By controlling the first switch and the second switch to be turned on or turned off, the first battery bank and the second battery bank can be combined as a whole to charge or discharge in a normal case, and the first battery bank and the second battery bank can also be separated into two independent battery banks when the battery is switched to the heating state, to implement charging and discharging of the two battery banks.

In an optional manner, the control module is further configured to: control the first switch to be turned off, and control the second switch to be turned on, such that the battery is switched to the heating state.

In a normal case, the first switch is turned on and the second switch is turned off, and the first battery bank and the second battery bank are connected in series. In this case, the battery may be configured to charge or discharge towards an external device. When the battery needs to be heated, the first switch is controlled to be turned off and the second switch is controlled to be turned on, and the first battery bank and the second battery bank switch from being connected in series to being separated into two independent battery banks.

In this case, the battery is in the heating state, and a charging and discharging process of the two battery banks can be performed to implement a heating process of the first battery bank and the second battery bank.

In an optional manner, the heating module includes a self-heating excitation unit, and the self-heating excitation unit includes a first bridge arm, a second bridge arm, a first capacitor, a second capacitor, and a first inductor. The first bridge arm and the first capacitor are connected in parallel to form a second branch, a first terminal of the second branch is connected to each of the switch module and the second battery bank, the second bridge arm and the second capacitor are connected in parallel to form a third branch, a first terminal of the third branch is connected to the first battery bank, a second terminal of the second branch is connected to a second terminal of the third branch, and the first inductor is connected between a midpoint of the first bridge arm and a midpoint of the second bridge arm. The control module is connected to each of the first bridge arm and the second bridge arm, and the control module is further configured to: when the battery is in the heating state, control the first bridge arm and the second bridge arm to form a loop for the first battery bank to discharge towards the second battery bank, and/or form a loop for the second battery bank to discharge towards the first battery bank, to heat the first battery bank and the second battery bank.

During heating of the battery, by controlling the first bridge arm and the second bridge arm, the loop for the first battery bank to discharge towards the second battery bank can be formed, and the loop for the second battery bank to discharge towards the first battery bank can also be formed. Through switching between the two loops, it can be ensured that electricity amounts of the battery banks are consistent before heating and after heating, so as to avoid that the battery is damaged during normal usage because electricity amounts of different battery banks are greatly different. This helps to protect the battery to prolong the service life of the battery. Additionally, the two battery banks can be heated simultaneously to obtain a higher heating rate.

In an optional manner, the heating module further includes a pre-charging unit, and the pre-charging unit is connected to each of the first capacitor, the second capacitor, the first battery bank, and the second battery bank. The control module is connected to the pre-charging unit, and the control module is further configured to: control the pre-charging unit to be in a first working state, such that the first battery bank charges the first capacitor, and/or the second battery bank charges the second capacitor; and if a voltage across both terminals of the first capacitor is not less than a first voltage threshold, and a voltage across both terminals of the second capacitor is not less than a second voltage threshold, control the pre-charging unit to be in a second working state, so as to stop charging the first capacitor and the second capacitor.

By providing the pre-charging unit to pre-charge the first capacitor and the second capacitor, it can be avoided that when the heating module is started, an instantaneous current output by the first battery bank is excessively large and consequently the first capacitor or an electronic element such as a switch in a conduction loop is broken down and damaged, or an instantaneous current output by the second battery bank is excessively large and consequently the second capacitor or an electronic element such as a switch in a conduction loop is broken down and damaged. Therefore, the safety of electronic elements such as the first capacitor, the second capacitor, and the switch in the conduction loop can be improved, and the service life of the electronic elements can be prolonged, which helps to improve the stability of the heating circuit of the battery.

In an optional manner, the pre-charging unit includes a third switch, a fourth switch, and a first resistor. The third switch and the first resistor are connected in series to form a fourth branch, the fourth branch is connected in parallel to the fourth switch, a first terminal of the fourth branch is connected to each of the first capacitor and the second capacitor, and a second terminal of the fourth branch is connected to each of the first battery bank and the second battery bank.

During charging of the first capacitor and the second capacitor, a charging current can be reduced by the first resistor, that is, the first resistor functions to limit the current. Therefore, it can be avoided that an electronic element such as the first capacitor, the second capacitor, or the switch in the conduction loop is damaged due to an excessively high charging current, so as to protect the first capacitor and the second capacitor.

In an optional manner, the control module is further configured to: control the third switch to be turned on, and control the fourth switch to be turned off, so as to control the pre-charging unit to be in the first working state; and control the fourth switch to be turned on, and control the third switch to be turned off, so as to control the pre-charging unit to be in the second working state.

When the third switch is turned on and the fourth switch is turned off, since the third switch is connected in series with the first resistor, the first resistor is added to a charging loop of the first capacitor and the second capacitor, and the first resistor is configured to function to limit the current. After the first capacitor and the second capacitor have been charged, the third switch is turned off and the fourth switch is turned on, and the loop where the first resistor is located is disconnected, so that an additional current loss of the first resistor can be avoided in the heating process of the battery, helping to improve heating efficiency.

In an optional manner, both the first terminal of the first branch and the second terminal of the first branch are used to connect with an external device, where the external device includes a charging device and a power consuming device, and the control module is further configured to: if a temperature of the first battery bank is not less than a first temperature threshold and a temperature of the second battery bank is not less than a second temperature threshold, control the first switch to be turned on, and control the second switch and the fourth switch to be turned off, such that the battery is switched to a usage state. When the battery is in the usage state, the battery is configured to discharge towards the power consuming device or be charged by the charging device.

When the battery has been heated, the first switch is controlled to be turned on, and the second switch and the fourth switch are controlled to be turned off, such that the battery is switched to the usage state. In this state, the first battery bank and the second battery bank are connected in series to form a whole. In this case, the battery can be configured to discharge towards the power consuming device or be charged by the charging device.

In an optional manner, the heating circuit for a battery further includes a first fuse module and a second fuse module. The first fuse module is connected to each of the first battery bank and the heating module, and the second fuse module is connected to each of the second battery bank, the heating module, and the switch module.

When an output current of the first battery bank is excessively large, the first fuse module can be fused to cut off the circuit in time, thereby protecting electronic elements in the circuit. Similarly, when an output current of the second battery bank is excessively large, the second fuse module can be fused to cut off the circuit in time, thereby protecting electronic elements in the circuit.

According to a second aspect, the present application provides a control method for a heating circuit for a battery, where a battery includes a first battery bank and a second battery bank, the heating circuit for a battery includes a switch module and a heating module, the switch module is connected to each of the first battery bank and the second battery bank, and the heating module is connected to each of the first battery bank, the second battery bank, and the switch module. The method includes: controlling the switch module to switch the battery to a heating state; and controlling the heating module when the battery is in the heating state, such that the first battery bank, the heating module, and the second battery bank form a loop; where the loop is used to transfer electricity between the first battery bank and the second battery bank, so as to heat the first battery bank and the second battery bank.

In an optional manner, the switch module includes a first switch and a second switch. A first terminal of a first branch formed by connecting the first battery bank, the first switch, and the second battery bank in series is connected to the heating module, a second terminal of the first branch is connected to each of a first terminal of the second switch and the heating module, and a connecting point between the first battery bank and the first switch is connected to a second terminal of the second switch.

In an optional manner, the controlling the switch module to switch the battery a heating state includes: if a heating request signal is received, controlling the first switch to be turned off, and controlling the second switch to be turned on, such that the battery is switched to a heating state.

In an optional manner, the heating module includes a self-heating excitation unit, and the self-heating excitation unit includes a first bridge arm, a second bridge arm, a first capacitor, a second capacitor, and a first inductor. The first bridge arm and the first capacitor are connected in parallel to form a second branch, a first terminal of the second branch is connected to the first battery bank, the second bridge arm and the second capacitor are connected in parallel to form a third branch, a first terminal of the third branch is connected to each of the switch module and the second battery bank, a second terminal of the second branch is connected to a second terminal of the third branch, and the first inductor is connected between a midpoint of the first bridge arm and a midpoint of the second bridge arm. The controlling the heating module when the battery is in the heating state, such that the first battery bank, the heating module, and the second battery bank form a loop includes: controlling the first bridge arm and the second bridge arm to form a loop for the first battery bank to discharge towards the second battery bank, and/or form a loop for the second battery bank to discharge towards the first battery bank.

In an optional manner, the heating module further includes a pre-charging unit, and the pre-charging unit is connected to each of the first capacitor, the second capacitor, the first battery bank, and the second battery bank. The method further includes: controlling the pre-charging unit to be in a first working state, such that the first battery bank charges the first capacitor, and/or the second battery bank charges the second capacitor; and if a voltage across both terminals of the first capacitor is not less than a first voltage threshold, and a voltage across both terminals of the second capacitor is not less than a second voltage threshold, controlling the pre-charging unit to be in a second working state, so as to stop charging the first capacitor and the second capacitor.

In an optional manner, the pre-charging unit includes a third switch, a fourth switch, and a first resistor. The third switch and the first resistor are connected in series to form a fourth branch, the fourth branch is connected in parallel to the fourth switch, a first terminal of the fourth branch is connected to each of the first capacitor and the second capacitor, and a second terminal of the fourth branch is connected to each of the first battery bank and the second battery bank.

In an optional manner, the controlling the pre-charging unit to be in a first working state includes: control the third switch to be turned on, and control the fourth switch to be turned off, so as to control the pre-charging unit to be in the first working state; and In an optional manner, the controlling the pre-charging unit to be in a second working state includes: controlling the fourth switch to be turned on; and controlling the third switch to be turned off, so as to control the pre-charging unit to be in the second working state.

In an optional manner, both the first terminal of the first branch and the second terminal of the first branch are used to connect with an external device, where the external device includes a charging device and a power consuming device. The method further includes: if a temperature of the first battery bank is greater than a first temperature threshold and a temperature of the second battery bank is greater than a second temperature threshold, controlling the first switch to be turned on, and controlling the second switch to be turned off, such that the battery is switched to a usage state; where when the battery is in the usage state, the battery is configured to discharge towards the power consuming device or be charged by the charging device.

According to a third aspect, the present application provides a battery, including: a first battery bank and a second battery bank, and the heating circuit for a battery according to the first aspect, where the heating circuit for a battery is connected to each of the first battery bank and the second battery bank, and the heating circuit for a battery is configured to heat the first battery bank and the second battery bank.

According to a fourth aspect, the present application provides an electric vehicle, including: a load and the battery according to the third aspect, where the battery is configured to supply power to the load.

According to a fifth aspect, the present application provides a computer-readable storage medium, storing computer-executable instructions, where the computer-executable instructions are set as the process of the method according to the second aspect.

Beneficial effects of the embodiments of the present application are as follows. In the heating circuit for a battery provided in the present application, the battery is switched to the heating state through the switch module, so that the first battery bank and the second battery bank can be separated into two independent battery banks. Then, the first battery bank can discharge towards the second battery bank through the heating module, and the second battery bank can also discharge towards the first battery bank through the heating module, so as to heat the first battery bank and the second battery bank. Therefore, there is no need to use an external high-voltage circuit as in the related art, that is, a current between the first battery bank and the second battery bank is not limited by an energy storage unit, so that the current between the first battery bank and the second battery bank can be controlled to be increased to increase the heating rate of the battery.

BRIEF DESCRIPTION OF THE DRAWINGS

In order to illustrate the technical solutions of the embodiments of the present application more clearly, the accompanying drawings required in the embodiments of the present application will be described briefly below. Obviously, the accompanying drawings described below are merely some embodiments of the present application, and for those of ordinary skill in the art, other accompanying drawings can also be obtained from these accompanying drawings without any creative efforts.

In the accompanying drawings, the figures are not drawn to scale.

DETAILED DESCRIPTION

Implementations of the present application will be further described in detail below in conjunction with the accompanying drawings and embodiments. The following detailed description of the embodiments and the accompanying drawings are used to illustrate the principle of the present application by way of example but should not be used to limit the scope of the present application. That is, the present application is not limited to the described embodiments.

In the description of the present application, it should be noted that "a plurality of" means two or more, unless otherwise specified. The orientation or position relationship indicated by the terms "upper", "lower", "left", "right", "inner", "outer", etc. is only for the convenience of describing the present application and simplifying the description, rather than indicating or implying that the device or element referred to must have a particular orientation or be constructed and operated in a particular orientation, and therefore should not be construed as a limitation on the present application. In addition, the terms "first", "second", "third", etc. are used for descriptive purposes only, and should not be construed as indicating or implying the relative importance. The term "perpendicular" does not mean being perpendicular in the strict sense, but within an allowable range of errors. The term "parallel" does not mean being parallel in the strict sense, but within an allowable range of errors.

The orientation terms in the following description all indicate directions shown in the accompanying drawings, but do not limit the specific structure in the present application. In the description of the present application, it should also be noted that the terms "mounting", "connect", and "connection" should be interpreted in the broad sense unless explicitly defined and limited otherwise. For example, the connection may be a fixed connection, a detachable connection, or an integral connection, or may be a direct connection, or an indirect connection by means of an intermediate medium. For those of ordinary skill in the art, the specific meanings of the terms mentioned above in the present application can be construed according to specific circumstances.

In recent years, the new energy vehicle industry has ushered in explosive growth. Batteries are the core of electric vehicles, and are also comprehensive representation of automotive engineering and power engineering technologies. However, due to electrochemical properties of batteries, charging and discharging capacities of batteries are greatly limited in a low temperature environment, which seriously affects car usage experience of customers in winter. Therefore, to use batteries normally, batteries need to be heated in a low temperature environment.

In the process of implementing the present application, it is found that: At present, in the related art, a common solution for heating a battery is to use an external high-voltage circuit of the battery to rapidly switch the battery between charging and discharging. Then, after a current flows through the battery, due to the internal resistance property of the battery, the battery directly generates heat inside and is heated, thereby implementing a heating process of the battery.

However, in this solution, when cells in the battery are of a parallel structure, a current flowing through the cells is a part of a total current flowing through the battery. As a result, the current flowing through the cells is reduced, and the heating efficiency of the cells is reduced, that is, the heating efficiency of the battery is also reduced. Additionally, to quickly switch the battery between charging and discharging, an external high-voltage circuit needs to be provided with an energy storage unit. The energy storage unit may be a motor or a special energy storage inductor. To achieve higher heating efficiency, the energy storage unit needs to provide larger charge and discharge currents. However, in actual usage, if the energy storage unit is a motor, which is usually applied to electric vehicles, in a design process of the motor, the main goal is to match the motor with the total vehicle power, which limits charging and discharging currents that can be provided by the motor. If the energy storage unit is an energy storage inductor, limiting factors such as volume and weight need to be considered, which also limits charging and discharging currents provided by the energy storage inductor. It can be seen that in this solution, the energy storage unit can only provide limited charging and discharging currents, resulting in a low heating rate of the battery.

In view of this, the applicant designs a heating circuit for a battery. The heating circuit for a battery switches the battery to a heating state when the battery needs to be heated, so as to discharge towards a second battery bank through a first battery bank, and/or discharge towards the first battery bank through the second battery bank, to implement a heating process of the battery. Therefore, there is no need to provide an external high-voltage circuit as in the related art, that is, a current between the first battery bank and the second battery bank is not limited by an energy storage unit, so that the current between the first battery bank and the second battery bank can be controlled to be increased to increase the heating rate of the battery. It can be seen that even if cells inside the first battery bank and the second battery bank are connected in parallel, a current flowing through the cells can be increased by controlling a current between the first battery bank and the second battery bank to be increased, thereby increasing the heating rate of the battery. In addition, because the current flows only between the first battery bank and the second battery bank, connecting wires between electronic elements only exist inside the battery. However, in the related art, because a high-voltage circuit is provided outside the battery, connecting wires thereof need to be connected to the battery from the external high-voltage circuit. Generally, the connecting wires connected to the battery from the outside are longer than the connecting wires inside the battery. That is, compared to the solution of providing a high-voltage circuit outside the battery in the related art, the connecting wires required in the present application are shorter, which can reduce the current loss on the connecting wires and help to improve heating efficiency.

The battery in the embodiments of the present application may be a lithium-ion battery, a lithium metal battery, a lead-acid battery, a nickel-cadmium battery, a nickel-hydrogen battery, a lithium-sulfur battery, a lithium-air battery, a sodium-ion battery, or the like, which is not limited herein. In terms of scale, each battery bank of the battery in the embodiments of the present application may be a battery cell, or a battery module, or a battery pack, which is not limited herein. In terms of application scenario, the battery may be applied to power apparatuses such as automobiles and ships. For example, the battery may be applied to electric vehicles to supply power to motors of electric vehicles as a power source of electric vehicles. The battery may also supply power to other power consuming components in electric vehicles, such as vehicle-mounted air conditioners and players.

An embodiment of the present application provides a power consuming apparatus including the battery in any embodiment of the present application. The power consuming apparatus may be, but is not limited to, a mobile phone, a tablet computer, a notebook computer, an electric toy, an electric tool, an electric scooter, an electric vehicle, a ship, a spacecraft, and the like. The electric toy may include fixed or mobile electric toys, such as game consoles, electric vehicle toys, electric ship toys, and electric airplane toys, and the spacecraft may include airplanes, rockets, space shuttles, spaceships, and the like.

For the convenience of understanding the present application, an applicable application scenario of the present application may be first described.

Figure 1:
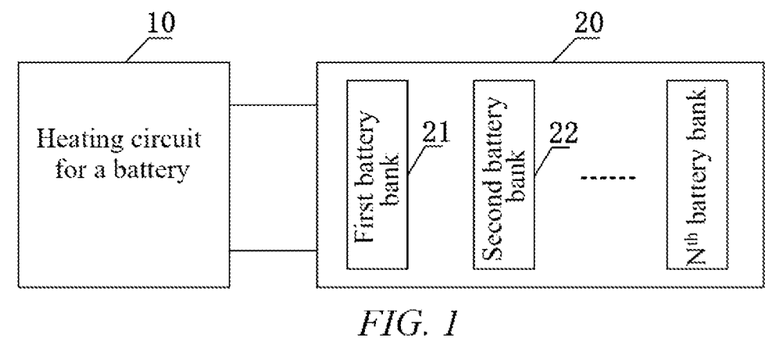
FIG. 1 is a schematic diagram of an application scenario according to an embodiment of the present application.

FIG. 1 shows an application scenario in which a battery 20 is heated by a heating circuit 10 for a battery. The heating circuit 10 for a battery is connected to the battery 20. The battery 20 includes N battery banks, such as a first battery bank, a second battery bank, . . . , and an $N^{th}$ battery bank shown in FIG. 1, where N is a positive integer greater than or equal to 2. The heating circuit 10 for a battery in this embodiment of the present application can simultaneously heat two battery banks each time. In other words, the N battery banks may be divided into multiple groups, each group has two battery banks, and the heating circuit 10 for a battery heats one group of battery banks each time. In this embodiment of the present application, how to group the N batteries is not limited, and an order of heating each group of battery banks is not limited either.

In addition, the battery 20 may also be connected to a power system, and the power system includes a motor and the like. The battery 20 may be connected to a drive circuit of the motor, and is configured to supply power to the drive circuit of the motor, so that an electric vehicle loaded with the battery 20 can travel.

In an implementation, a battery management system (BMS) of the battery 20 collects state information of the battery 20, such as a battery temperature, a state of charge (SOC), a voltage signal, and a current signal, and determines, based on the state information, whether the battery 20 needs to be heated. When it is determined that the battery 20 needs to be heated, the BMS may send a heating request to a vehicle control unit (VCU). According to the heating request sent by the BMS, the VCU starts the heating circuit 10 for a battery to heat the battery 20.

In the present application, usage scenarios of the heating circuit 10 for a battery are not limited, and the heating circuit 10 for a battery in this embodiment of the present application may implement the heating process of the battery 20 under any necessary circumstances.

Hereinafter, an example in which the battery 20 includes a first battery bank 21 and a second battery bank 22 is used, to describe how the heating circuit 10 for a battery heats the battery 20 simultaneously.

Figure 2:
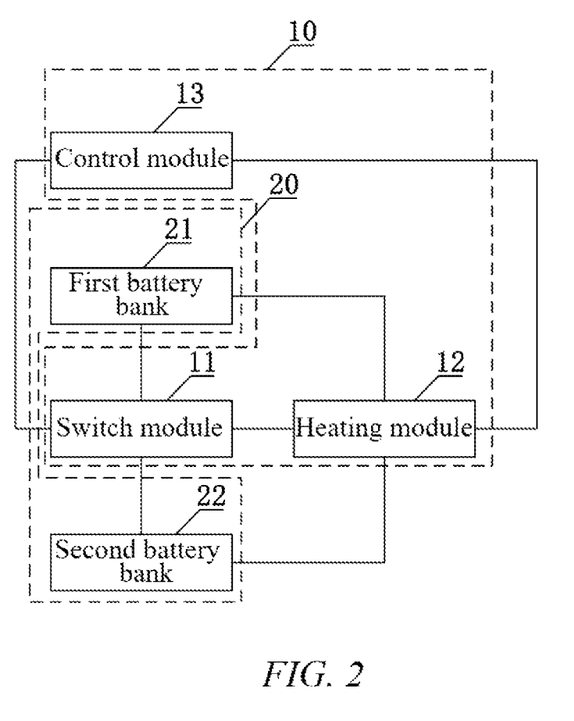
FIG. 2 is a schematic diagram of a structure of a heating circuit for a battery according to an embodiment of the present application.

FIG. 2 is a schematic diagram of a structure of connection between the heating circuit 10 for a battery and the battery 20 according to an embodiment of the present application. As shown in FIG. 2, the heating circuit 10 for a battery includes a switch module 11, a heating module 12, and a control module 13. The switch module 11 is connected to each of the first battery bank 21 and the second battery bank 22, the heating module 12 is connected to each of the first battery bank 21, the second battery bank 22, and the switch module 11, and the control module 13 is connected to each of the switch module 11 and the heating module 12.

Specifically, the control module 13 is configured to: control the switch module 11 to switch the battery 20 to a heating state, and is configured to control the heating module 12 when the battery 20 is in the heating state, such that the first battery bank 21, the heating module 12, and the second battery bank 22 form a loop. The loop is used to transfer electricity between the first battery bank 21 and the second battery bank 22, so as to heat the first battery bank 21 and the second battery bank 22.

The control module 13 may be a VCU, or a control module relatively independent from the VCU, for example, a control module specially provided for the heating circuit 10 for a battery, which is not limited in this embodiment of the present application.

Under normal circumstances, the first battery bank 21 and the second battery bank 22 form the battery 20 as a whole, to be configured to discharge towards an external power consuming device or to be configured to be charged by an external device. When the battery 20 needs to be heated, the battery 20 can be switched to the heating state by controlling the switch module 11. In this case, the first battery bank 21 and the second battery bank 22 are separated into two independent battery banks. In other words, the heating state means that the battery 20 is in a state in which the battery can be heated. In addition, in this case, the battery 20 can neither be configured to discharge towards an external power consuming device, nor can be configured to be charged by an external device.

Furthermore, the heating module 12 can be then controlled, such that the first battery bank 21, the heating module 12, and the second battery bank 22 form a loop. In this loop, the first battery bank 21 can discharge towards the second battery bank 22 through the heating module 12, and/or the second battery bank 22 can discharge towards the first battery bank 21 through the heating module 12.

According to Joule's law, heat is generated when a current flows through a conductor (for example, a resistor), and the generated heat is proportional to a resistance of the conductor, a square of the current passing through the conductor, and a power-on time. Therefore, because the first battery bank 21 and the second battery bank 22 both have an internal resistance, when a current flows through the first battery bank 21 and the second battery bank 22, heat is generated, so that the heating process of the first battery bank 21 and the second battery bank 22 can be implemented.

In this embodiment, there is no need to provide an external high-voltage circuit as in the related art, that is, a current between the first battery bank 21 and the second battery bank 22 is not limited by an energy storage unit, so that the current between the first battery bank 21 and the second battery bank 22 can be controlled to be increased to increase the heating rate of the battery 20.

Second, the first battery bank 21 and the second battery bank 22 can be heated simultaneously, which also helps to increase the heating rate of the battery.

In addition, because the current flows only between the first battery bank 21 and the second battery bank 22, connecting wires between electronic elements only exist inside the battery. However, in the related art, because a high-voltage circuit needs to be provided outside the battery, connecting wires connected to the battery from the external high-voltage circuit outside the battery need to be provided. As can be seen, compared to the solution of providing a high-voltage circuit outside the battery in the related art, the connecting wires required in the present application are shorter, which can reduce the current loss on the connecting wires and help to improve heating efficiency.

Figure 3:
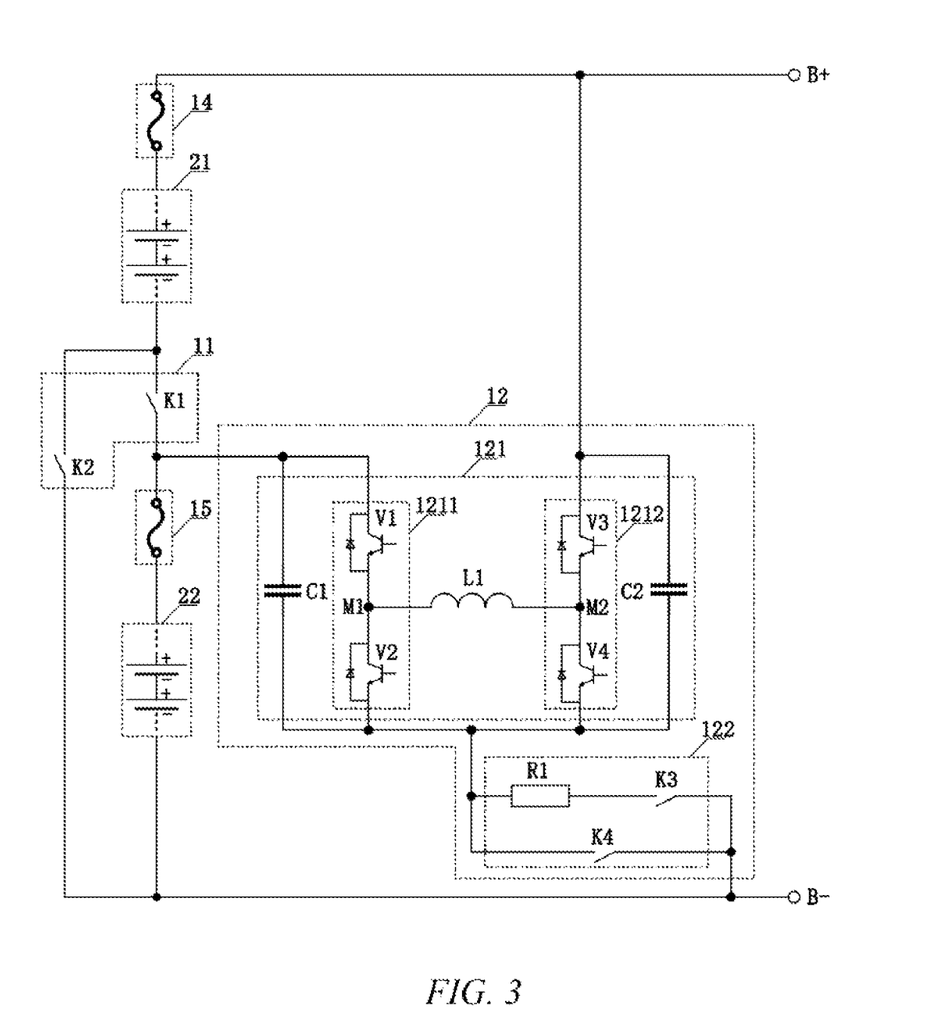
FIG. 3 is a schematic diagram of a circuit structure of a heating circuit for a battery according to an embodiment of the present application.

In an embodiment, as shown in FIG. 3, the switch module 11 includes a first switch K1 and a second switch K2. The first battery bank 21, the first switch K1, and the second battery bank 22 are connected in series to form a first branch, a first terminal (that is, a positive electrode of the first battery bank 21) of the first branch is connected to the heating module 12, a second terminal (that is, a negative electrode of the second battery bank 22) of the first branch is connected to each of a first terminal of the second switch K2 and the heating module 12, a connecting point between the first battery bank 21 and the first switch K1 is connected to a second terminal of the second switch K2, and a connecting point between the second battery bank 22 and the first switch K1 is connected to the heating module 12. The first switch K1 and the second switch K2 are further connected to the control module 13 (not shown in FIG. 3), that is, the first switch K1 and the second switch K2 are controlled by the control module 13.

It should be understood that, in this embodiment, for example, both the first battery bank 21 and the second battery bank 22 include multiple cells connected in series. In other embodiments, the first battery bank 21 and the second battery bank 22 may also include multiple cells connected in parallel, which is not limited in this embodiment of the present application.

In this embodiment, the control module 13 controls the first switch K1 and the second switch K2 to be turned on or turned off. In this way, the first battery bank 21 and the second battery bank 22 can be combined as a whole to charge or discharge in a normal case.

For example, in an embodiment, the control module 13 controls the first switch K1 to be turned on, and controls the second switch K2 to be turned off, so as to connect the first battery bank 21 and the second battery bank 22 in series to form a whole. In this case, if the first terminal of the first branch is connected to an external device through a port B+, the second terminal of the first branch is connected to an external device through a port B−. The external device includes a charging device and a power consuming device. Then, the battery 20 can discharge towards the power consuming device, or can be charged by the charging device through the port B+ and the port B−.

Additionally, the battery 20 can be switched to the heating state, that is, the first battery bank 21 and the second battery bank 22 are separated into two independent battery banks, so as to implement the charging and discharging process of the two battery banks.

For example, in an implementation, the control module 13 controls the first switch K1 to be turned off, and controls the second switch K2 to be turned on, so as to separate the first battery bank 21 and the second battery bank 22 connected in series into two independent battery banks, and switch the battery 20 to the heating state. In this case, the positive electrode of the first battery bank 21 is connected to a positive electrode of the second battery bank 22 through the heating module 12, and a negative electrode of the first battery bank 21 is connected to the negative electrode of the second battery bank 22. Then, by controlling the heating module 12, the first battery bank 21 can discharge towards the second battery bank 22 (that is, the second battery bank 22 is charged), and the second battery bank 22 can discharge towards the first battery bank 21 (that is, the first battery bank 21 is charged), that is, the charging and discharging process of the first battery bank 21 and the second battery bank 22 is implemented, so as to implement the heating process of the first battery bank 21 and the second battery bank 22.

It should be noted that, in the related art, the premise of implementing charging and discharging of two battery banks is that the two battery banks are connected in parallel. However, a voltage provided by two battery banks connected in parallel is a voltage of a single battery bank, which is difficult to satisfy an application scenario with a high voltage requirement. Instead, the present application is only applicable to a case in which the first battery bank 21 and the second battery bank 22 are connected in series. Therefore, when the battery 20 needs to be heated, the battery 20 can be separated into two independent battery banks by controlling the first switch K1 and the second switch K2, to implement the heating process of the battery 20. In addition, when the battery 20 needs to supply power to an external device, the first battery bank 21 and the second battery bank 22 are connected in series to form a whole by controlling the first switch K1 and the second switch K2, so as to provide a higher voltage for the external device to meet an application scenario with a high voltage requirement.

In an embodiment, the heating module 12 includes a self-heating excitation unit 121, and the self-heating excitation unit 121 includes a first bridge arm 1211, a second bridge arm 1212, a first capacitor C1, a second capacitor C2, and a first inductor L1. The first bridge arm 1211 and the first capacitor C1 are connected in parallel to form a second branch, a first terminal of the second branch is connected to each of the switch module 11 and the second battery bank 22, the second bridge arm 1212 and the second capacitor C2 are connected in parallel to form a third branch, a first terminal of the third branch is connected to the first battery bank 21, a second terminal of the second branch is connected to a second terminal of the third branch, and the first inductor L1 is connected between a midpoint M1 of the first bridge arm 1211 and a midpoint M2 of the second bridge arm 1212.

The control module 13 is connected to each of the first bridge arm 1211 and the second bridge arm 1212, and the control module is further configured to: when the battery is in the heating state, control the first bridge arm 1211 and the second bridge arm 1212 to form a loop for the first battery bank 21 to discharge towards the second battery bank 22, and/or form a loop for the second battery bank 22 to discharge towards the first battery bank 21, to heat the first battery bank 21 and the second battery bank 22.

In this embodiment, since the first capacitor C1 is connected in parallel to the second battery bank 22, and the second capacitor C2 is connected in parallel to the first battery bank 21, the first capacitor C1 and the second capacitor C2 can perform a function such as voltage stabilization, thereby reducing voltage fluctuation of the second battery bank 22 and the first battery bank 21 and improving the voltage stability of the second battery bank 22 and the first battery bank 21.

Specifically, when the battery 20 is heated, by controlling the first bridge arm 1211 and the second bridge arm 1212, the loop for the first battery bank 21 to discharge towards the second battery bank 22 can be formed, and the loop for the second battery bank 22 to discharge towards the first battery bank 21 can also be formed. By switching between the two loops, a current can flow between the first battery bank 21 and the second battery bank 22, that is, energy exchange between the first battery bank 21 and the second battery bank 22 can be implemented, so as to always keep the electricity amounts of the first battery bank 21 to be the same before and after heating and the electricity amounts of the second battery bank 22 to be the same before and after heating.

For example, in an implementation, a state of charge (SOC) of the first battery bank 21 before heating is 50%. Then, the SOC of the first battery bank 21 is also 50% after heating is completed, so as to keep the electricity amounts of the first battery bank 21 to be the same before and after heating. Therefore, this can avoid that the battery 20 is damaged during normal usage because electricity amounts of different battery banks are greatly different. This helps to protect the battery 20 to prolong the service life of the battery 20.

In addition, in this embodiment, the first battery bank 21 and the second battery bank 22 can be heated simultaneously, which helps to increase the heating rate of the battery.

In an implementation, the first bridge arm 1211 includes a switch transistor V1 and a switch transistor V2 connected in series, and the second bridge arm 1212 includes a switch transistor V3 and a switch transistor V4 connected in series.

In this implementation, when the battery 20 is in the heating state, the control module 13 can control the switch transistor V3 and the switch transistor V2 to be simultaneously turned on, to form a loop including the first battery bank 21, the switch transistor V3, the first inductor L1, and the switch transistor V2, so that the first battery bank 21 discharges towards the first inductor L1 (the first inductor L1 functions to store energy). Then, the control module 13 controls the switch transistor V3 and the switch transistor V1 to be simultaneously turned on, to form a loop including the first battery bank 21, the switch transistor V3, the first inductor L1, the switch transistor V1, and the second battery bank 22, so that the first battery bank 21 and the first inductor L1 discharge towards the second battery bank 22. The combination of the above two processes completes the entire process in which the first battery bank 21 discharges towards the second battery bank 22.

Alternatively, the control module 13 can control the switch transistor V1 and the switch transistor V4 to be simultaneously turned on, to form a loop including the second battery bank 22, the switch transistor V1, the first inductor L1, and the switch transistor V4, so that the second battery bank 22 discharges towards the first inductor L1. Then, the control module 13 controls the switch transistor V1 and the switch transistor V3 to be simultaneously turned on, to form a loop including the second battery bank 22, the switch transistor V1, the first inductor L1, the switch transistor V3, and the first battery bank 21, so that the second battery bank 22 and the first inductor L1 discharge towards the first battery bank 21. The combination of the above two processes completes the entire process in which the second battery bank 22 discharges towards the first battery bank 21.

It can be understood that, in this embodiment, switch transistors that are not controlled to be turned on are all in a disconnected state. For example, when the control module 13 controls the switch transistor V3 and the switch transistor V2 to be simultaneously turned on, the switch transistor V1 and the switch transistor V4 are in the disconnected state.

In addition, in this embodiment, the first inductor L1 is only configured to store energy during the process, and the transfer of energy is mainly between the first battery bank 21 and the second battery bank 22. The first inductor L1 with a small inductance value can be selected to perform the above function. In the related art, if the external high-voltage circuit is provided with an energy storage inductor, the transfer of energy is mainly between the energy storage inductor and the battery. In this case, the energy storage inductor with a large inductance value needs to be selected to provide large charging and discharging currents. It can be seen that, compared with the related art, in the present application, the first inductor L1 with a small inductance value can be selected, so as to reduce a current loss on the first inductor L1 and have higher heating efficiency.

In an embodiment, the heating module 12 further includes a pre-charging unit 122. The pre-charging unit 122 is connected to each of the first capacitor C1, the second capacitor C2, the first battery bank 21, and the second battery bank 22. The control module 13 is connected to the pre-charging unit 122.

The control module 13 is further configured to: control the pre-charging unit 122 to be in a first working state, such that the first battery bank 21 charges the first capacitor C1, and/or the second battery bank 22 charges the second capacitor C2; and if a voltage across both terminals of the first capacitor C1 is not less than a first voltage threshold, and a voltage across both terminals of the second capacitor C2 is not less than a second voltage threshold, control the pre-charging unit 122 to be in a second working state, so as to stop charging the first capacitor C1 and the second capacitor C2.

The first voltage threshold may be a minimum voltage value that the voltage across both terminals of the first capacitor C1 should reach, and the second voltage threshold may be a minimum voltage value that the voltage across both terminals of the second capacitor C2 should reach. In other words, when the heating module 12 is started, only when the voltage across both terminals of the first capacitor C1 is greater than or equal to the first voltage threshold, it can be avoided that the first capacitor C1 is broken down due to an excessively large current. Similarly, when the heating module 12 is started, only when the voltage across both terminals of the second capacitor C2 is greater than or equal to the second voltage threshold, it can be avoided that the second capacitor C2 is broken down due to an excessively large current.

Second, the first voltage threshold and the second voltage threshold can be set according to actual application cases, and the first voltage threshold and the second voltage threshold can be the same or different, which is not limited in this embodiment of the present application.

Specifically, by controlling the pre-charging unit 122 to be in the first working state, the first capacitor C1 and the second capacitor C2 can be pre-charged. When the voltage across both terminals of the first capacitor C1 is not less than the first voltage threshold and the voltage across both terminals of the second capacitor C2 is not less than the second voltage threshold, it is determined that both the first capacitor C1 and the second capacitor C2 have been pre-charged.

In addition, the process of pre-charging the first capacitor C1 and the second capacitor C2 should be completed before the heating module 12 is controlled. In other words, only after the first capacitor C1 and the second capacitor C2 have been pre-charged, the control module 13 can control the heating module 12 to complete the heating process. It can be avoided that when the heating module 12 is started, an instantaneous current output by the first battery bank 21 is excessively large and consequently the first capacitor C1 or an electronic element such as a switch in a conduction loop is broken down and damaged. The conduction loop is a loop for charging the first capacitor C1. It can also be avoided that when the heating module 12 is started, an instantaneous current output by the second battery bank 22 is excessively large and consequently the second capacitor C2 or an electronic element such as a switch in a conduction loop is broken down and damaged. The conduction loop is a loop for charging the second capacitor C2. Therefore, the first capacitor C1 and the second capacitor C2 can be protected to prolong the service life of the first capacitor C1 and the second capacitor C2, which helps to improve the stability of the heating circuit 10 for a battery.

In an embodiment, the pre-charging unit 122 includes a third switch K3, a fourth switch K4, and a first resistor R1. The third switch K3 and the first resistor R1 are connected in series to form a fourth branch, the fourth branch is connected in parallel to the fourth switch K4, a first terminal of the fourth branch is connected to each of the first capacitor C1 and the second capacitor C2, and a second terminal of the fourth branch is connected to each of the first battery bank 21 and the second battery bank 22.

The third switch K3 and the fourth switch K4 are further connected to the control module 13, and the control module 13 can control the third switch K3 and the fourth switch K4 to be turned on or turned off.

In this embodiment, if the first capacitor C1 and the second capacitor C2 are to be pre-charged, the first resistor R1 needs to be connected in the charging loop to limit a current. It can be avoided that the first capacitor C1 or an electronic element such as a switch in a conduction loop is broken down due to an excessively large charging current at a moment when the first battery bank 21 starts charging. It can also be avoided that the second capacitor C2 or an electronic element such as a switch in a conduction loop is broken down due to an excessively large charging current at a moment when the second battery bank 22 starts charging. This helps to improve the safety of electronic elements such as the first capacitor C1 and the second capacitor C2, and prolong the service life of electronic elements such as the first capacitor C1 and the second capacitor C2.

However, if the first capacitor C1 and the second capacitor C2 have been pre-charged, the loop where the first resistor R1 is located should be disconnected, so as to prevent the first resistor R1 from causing an additional current loss in a heating process of the first battery bank 21 and the second battery bank 22, which helps to maintain high heating efficiency.

In an embodiment, the control module 13 is further configured to: control the third switch K3 to be turned on, and control the fourth switch K4 to be turned off, so as to control the pre-charging unit 122 to be in the first working state; and control the fourth switch K4 to be turned on, and control the third switch K3 to be turned off, so as to control the pre-charging unit 122 to be in the second working state.

When the third switch K3 is turned on and the fourth switch K4 is turned off, the charging loop of the first capacitor C1 is: the second battery bank 22, the first capacitor C1, and the first resistor R1; and the charging loop of the second capacitor C2 is: the first battery bank 21, the second capacitor C2, and the first resistor R1. It can be seen that, in this case, the first resistor R1 is added to the charging loop of the first capacitor C1 and the second capacitor C2, so as to avoid that electronic elements such as the first capacitor C1, the second capacitor C2, and the switch (for example, the third switch K3) in the conduction loop are broken down due to an excessively large current.

After the first capacitor C1 and the second capacitor C2 have been pre-charged, the fourth switch K4 is first turned on, and after the fourth switch K4 is turned on, the third switch K3 is turned off. The loop where the first resistor R1 is located is disconnected, so that the current does not flow through the first resistor R1 in the heating process of the first battery bank 21 and the second battery bank 22, which can prevent the first resistor R1 from causing an additional current loss and help to improve heating efficiency.

In an embodiment, after the first battery bank 21 and the second battery bank 22 are heated, the control module 13 is further configured to: if a temperature of the first battery bank 21 is not less than a first temperature threshold and a temperature of the second battery bank 22 is not less than a second temperature threshold, control the first switch K1 to be turned on, and control the second switch K2 and the fourth switch K4 to be turned off, such that the battery 20 is switched to a usage state.

When the battery 20 is in the usage state, the battery 20 is configured to discharge towards a power consuming device through the port B+ and the port B−, or be charged by a charging device through the port B+ and the port B−.

The first temperature threshold may be a minimum temperature value that the temperature of the first battery bank 21 needs to reach, and the second temperature threshold may be a minimum temperature value that the temperature of the second battery bank 22 needs to reach. In other words, when the temperature of the first battery bank 21 is greater than or equal to the first temperature threshold, the first battery bank 21 has been heated. When the temperature of the second battery bank 22 is greater than or equal to the second temperature threshold, the second battery bank 22 has been heated.

Second, the first temperature threshold and the second temperature threshold can be set according to actual application cases, and the first temperature threshold and the second temperature threshold can be the same or different, which is not limited in this embodiment of the present application.

When both the first battery bank 21 and the second battery bank 22 have been heated, the first switch K1 is controlled to be turned on, and the second switch K2 and the fourth switch K4 are controlled to be turned off, to switch the battery 20 from the heating state to the usage state. In the usage state, the first battery bank 21 and the second battery bank 22 are connected in series to form a whole. In this case, the battery 20 can be configured to discharge towards the power consuming device or be charged by the charging device.

In an embodiment, the heating circuit 10 for a battery further includes a first fuse module 14 and a second fuse module 15. The first fuse module 14 is connected to each of the first battery bank 21 and the heating module 12, and the second fuse module 15 is connected to each of the second battery bank 22, the switch module 11, and the heating module 12.

In this embodiment, when an output current of the first battery bank 21 is excessively large, the first fuse module 14 can be fused to cut off the circuit in time, thereby protecting electronic elements in the heating circuit 10 for a battery. Similarly, when an output current of the second battery bank 22 is excessively large, the second fuse module 15 can be fused to cut off the circuit in time, thereby protecting electronic elements in the heating circuit 10 for a battery.

In an implementation, both the first fuse module 14 and the second fuse module 15 include a fuse, so as to blow when the output current of the first battery bank 21 or the second battery bank 22 is excessively large, to protect the first battery bank 21 and the second battery bank 22.

In an implementation, the heating circuit 10 for a battery and the battery 20 shown in FIG. 3 can be applied to an electric vehicle. The battery 20 can be configured to supply power to a power consuming component in an electric vehicle, such as a vehicle-mounted air conditioner and motor.

Under normal conditions, that is, when the battery 20 is in the usage state, a BMS in an electric vehicle controls the first switch K1 to be turned on, and controls the second switch K2, the third switch K3, and the fourth switch K4 to be turned off. In this case, the first battery bank 21 and the second battery bank 22 are connected in series as a whole, and can supply power to a power consuming component such as an air conditioner in an electric vehicle through a port B+ and a port B−, or are charged by a charging device such as a charging pile.

When the battery 20 needs to be heated, the BMS first controls the first switch K1 to be turned off, and controls the second switch K2 to be turned on, so as to switch the battery 20 to the heating state. Then, the BMS controls the third switch K3 to be turned on, and keeps the fourth switch K4 to be turned off, so as to implement a pre-charging process of the first capacitor C1 and the second capacitor C2.

After the first capacitor C1 and the second capacitor C2 have been pre-charged, the third switch K3 is turned off, and the fourth switch K4 is turned on. In this case, the BMS can start to control the switch transistors in the self-heating excitation unit 121 to be turned on or turned off, to form a loop for the first battery bank 21 to discharge towards the second battery bank 22, and/or form a loop for the second battery bank 22 to discharge towards the first battery bank 21, to complete a heating process of the first battery bank 21 and the second battery bank 22.

Then, after the first battery bank 21 and the second battery bank 22 have been heated, the BMS controls the first switch K1 to be turned on, controls the second switch K2, the third switch K3, and the fourth switch K4 to be turned off, and switches the battery 20 to the usage state again.

Figure 4:
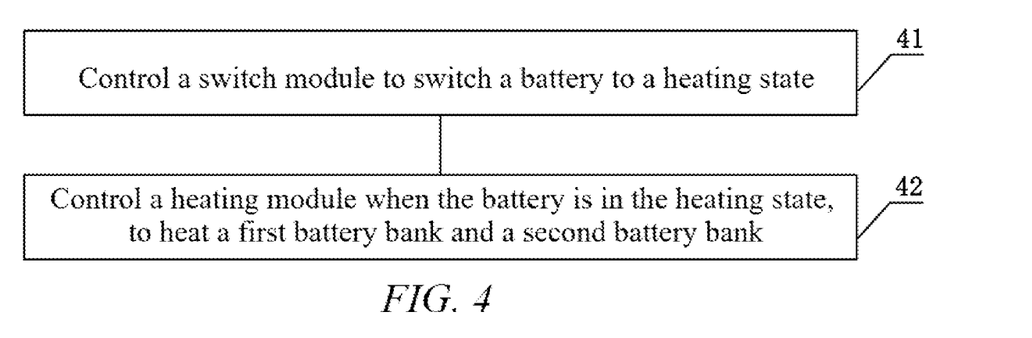
FIG. 4 is a flowchart of a control method for a heating circuit for a battery according to an embodiment of the present application.

FIG. 4 is a flowchart of a control method for a heating circuit for a battery according to an embodiment of the present application. The battery includes a first battery bank and a second battery bank, and for a structure of the heating circuit for a battery, refer to the above specific descriptions of FIG. 2 and FIG. 3. Details are not repeated herein. As shown in FIG. 4, the control method for a heating circuit for a battery includes the following steps:

41: Control the switch module to switch the battery to a heating state. 42: Control the heating module when the battery is in the heating state, such that the first battery bank, the heating module, and the second battery bank form a loop. The loop is used to transfer electricity between the first battery bank and the second battery bank, so as to heat the first battery bank and the second battery bank.

Based on the above technical solution, the first battery bank and the second battery bank can be separated into two independent battery banks by controlling the switch module, such that the first battery bank can discharge towards the second battery bank through the heating module, and/or the second battery bank can discharge towards the first battery bank through the heating module, so as to heat the first battery bank and the second battery bank. Therefore, there is no need to provide an external high-voltage circuit as in the related art. As can be seen, a current between the first battery bank and the second battery bank is not limited by an energy storage unit, so that the current between the first battery bank and the second battery bank can be controlled to be increased to increase the heating rate of the battery. In addition, the first battery bank and the second battery bank can be heated simultaneously in the charging and discharging process of the two battery banks, and the heating efficiency can also be improved.

In an embodiment, the switch module includes a first switch and a second switch. A first terminal of a first branch formed by connecting the first battery bank, the first switch, and the second battery bank in series is connected to the heating module, a second terminal of the first branch is connected to each of a first terminal of the second switch and the heating module, and a connecting point between the first battery bank and the first switch is connected to a second terminal of the second switch.

In an embodiment, the controlling the switch module to switch the battery to a heating state includes: if a heating request signal is received, controlling the first switch to be turned off, and controlling the second switch to be turned on, such that the battery is switched to a heating state.

The heating request signal may be a signal manually sent, for example, a user presses a button to output the heating request signal. The heating request signal can also be a signal sent by the control module, for example, the control module sends the heating request signal when detecting that the temperature of the battery is excessively low. This is not limited in this embodiment of the present application.

In an embodiment, the heating module includes a self-heating excitation unit, and the self-heating excitation unit includes a first bridge arm, a second bridge arm, a first capacitor, a second capacitor, and a first inductor. The first bridge arm and the first capacitor are connected in parallel to form a second branch, a first terminal of the second branch is connected to the first battery bank, the second bridge arm and the second capacitor are connected in parallel to form a third branch, a first terminal of the third branch is connected to each of the switch module and the second battery bank, a second terminal of the second branch is connected to a second terminal of the third branch, and the first inductor is connected between a midpoint of the first bridge arm and a midpoint of the second bridge arm.

The controlling the heating module when the battery is in the heating state, such that the first battery bank, the heating module, and the second battery bank form a loop includes: controlling the first bridge arm and the second bridge arm to form a loop for the first battery bank to discharge towards the second battery bank, and/or form a loop for the second battery bank to discharge towards the first battery bank.

In an embodiment, the heating module further includes a pre-charging unit, and the pre-charging unit is connected to each of the first capacitor, the second capacitor, the first battery bank, and the second battery bank.

The control method for a heating circuit for a battery further includes: controlling the pre-charging unit to be in a first working state, such that the first battery bank charges the first capacitor, and/or the second battery bank charges the second capacitor; and if a voltage across both terminals of the first capacitor is not less than a first voltage threshold, and a voltage across both terminals of the second capacitor is not less than a second voltage threshold, controlling the pre-charging unit to be in a second working state, so as to stop charging the first capacitor and the second capacitor.

In an embodiment, the pre-charging unit includes a third switch, a fourth switch, and a first resistor. The third switch and the first resistor are connected in series to form a fourth branch, the fourth branch is connected in parallel to the fourth switch, a first terminal of the fourth branch is connected to each of the first capacitor and the second capacitor, and a second terminal of the fourth branch is connected to each of the first battery bank and the second battery bank.

In an embodiment, the controlling the pre-charging unit to be in a first working state includes: control the third switch to be turned on, and control the fourth switch to be turned off, so as to control the pre-charging unit to be in the first working state; and In an embodiment, the controlling the pre-charging unit to be in a second working state includes: controlling the fourth switch to be turned on, and controlling the third switch to be turned off, so as to control the pre-charging unit to be in the second working state.

In an embodiment, both the first terminal of the first branch and the second terminal of the first branch are used to connect with an external device, where the external device includes a charging device and a power consuming device.

The control method for a heating circuit for a battery further includes: if a temperature of the first battery bank is not less than a first temperature threshold and a temperature of the second battery bank is not less than a second temperature threshold, controlling the first switch to be turned on, and controlling the second switch to be turned off, so that the battery is switched to a usage state; where when the battery is in the usage state, the battery is configured to discharge towards the power consuming device or be charged by the charging device.

It should be understood that, for the specific control of the heating circuit for a battery and the beneficial effects produced in the method embodiments, reference may be made to the corresponding descriptions in the above apparatus embodiments. For brevity, details are not repeated herein.

Figure 5:
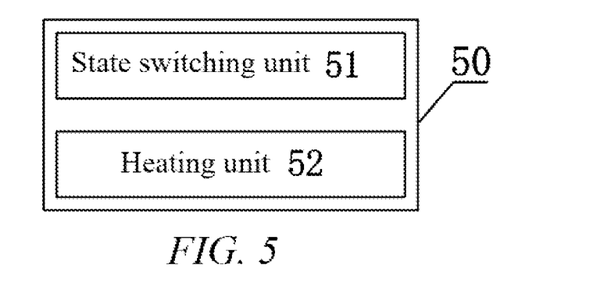
FIG. 5 is a schematic diagram of a structure of a control apparatus for a heating circuit for a battery according to an embodiment of the present application.

FIG. 5 is a schematic diagram of a structure of a control apparatus 50 for a heating circuit for a battery according to an embodiment of the present application. As shown in FIG. 5, the control apparatus 50 for a heating circuit for a battery includes: a state switching unit 51 and a heating unit 52.

The state switching unit 51 is configured to control a switch module, such that a battery is switched to a heating state.

The heating unit 52 is configured to control the heating module when the battery is in the heating state, such that the first battery bank, the heating module, and the second battery bank form a loop. The loop is used to transfer electricity between the first battery bank and the second battery bank, so as to heat the first battery bank and the second battery bank.

The above-mentioned product can execute the method provided by the embodiment of the present application shown in FIG. 4, and has corresponding functional modules and beneficial effects for executing the method. For technical details not described in detail in this embodiment, refer to the method provided in the embodiments of the present application.

Figure 6:
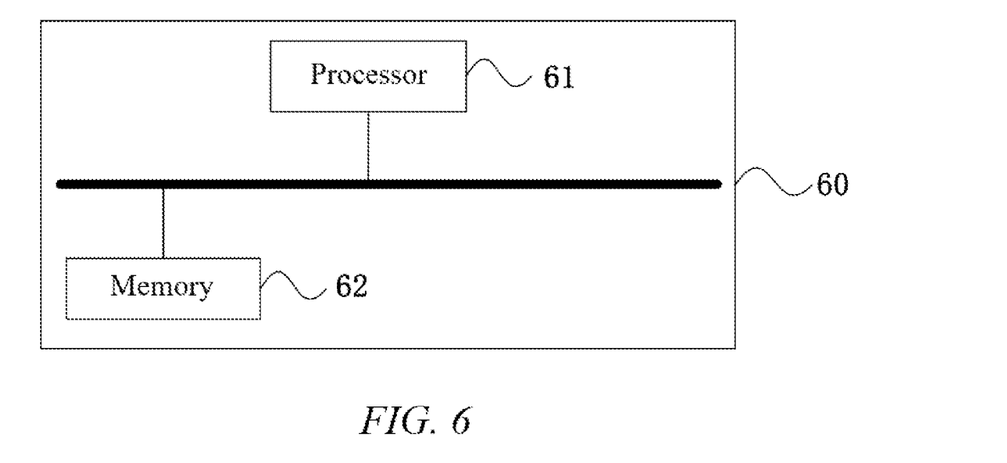
FIG. 6 is a schematic diagram of a structure of a control apparatus for a heating circuit for a battery according to another embodiment of the present application.

FIG. 6 is a schematic diagram of a structure of a control apparatus 60 for a heating circuit for a battery according to an embodiment of the present application. As shown in FIG. 6, the control apparatus 60 for a heating circuit for a battery includes one or more processors 61 and a memory 62. One processor 61 is used as an example in FIG. 6.

The processor 61 and the memory 62 can be connected through a bus or in other manners. In FIG. 6, connection through a bus is used as an example.

The memory 62, as a non-volatile computer-readable storage medium, can be configured to store non-volatile software programs, and non-volatile computer-executable programs and modules, such as program instructions/modules (for example, units in FIG. 5) corresponding to the control method for a heating circuit for a battery in the embodiments of the present application. The processor 61 executes various functional applications and data processing of the control apparatus 60 for a heating circuit for a battery by running the non-volatile software programs, instructions and modules stored in the memory 62, that is, performs the control method for a heating circuit for a battery in the above method embodiments and the functions of the units in the above apparatus embodiment.

The memory 62 may include a high-speed random access memory, and may further include a non-volatile memory, for example, at least one magnetic disk storage device, a flash memory device, or another non-volatile solid-state storage device. In some embodiments, the memory 62 may optionally include memories that are remotely located relative to the processor 61, and these remote memories may be connected to the processor 61 through a network. The network may include, but is not limited to, the Internet, an intranet, a local area network, a mobile communication network, and a combination thereof.

The program instructions/modules are stored in the memory 62, and when the program instructions/modules are executed by the one or more processors 61, the control method for a heating circuit for a battery in any one of the above method embodiments is performed, for example, the steps shown in FIG. 4 are performed, or the functions of the units in FIG. 5 can be performed.

An embodiment of the present application further provides a battery, including a first battery bank, a second battery bank, and the heating circuit for a battery in any one of the above embodiments. The heating circuit for a battery is configured to heat the first battery bank and the second battery bank.

An embodiment of the present application further provides an electric vehicle, including a load and the battery in any one of the above embodiments. The battery is configured to supply power to the load.

An embodiment of the present application further provides a non-volatile computer storage medium. The computer storage medium stores computer-executable instructions, and when the computer-executable instructions are executed by one or more processors, the one or more processors can be caused to perform the control method for a heating circuit for a battery in any of the above method embodiments. For example, the steps in FIG. 4 are performed. The functions of the units in FIG. 5 can also be performed. The apparatus or apparatus embodiment described above is only illustrative, the units or modules described as separate components may or may not be physically separated, and components displayed as modules or units may or may not be physical units, may be located in one place, or may be distributed on multiple network modules or units. Some or all of the modules may be selected based on an actual requirement to implement the objectives of the solutions in the embodiments.

According to the foregoing descriptions of the implementations, a person skilled in the art may clearly understand that the implementations may be implemented by using software and a universal hardware platform, or certainly may be implemented by using hardware. Based on such an understanding, the technical solutions essentially or the part contributing to the prior art may be implemented in a form of a software product. The computer software product is stored in a computer-readable storage medium such as a ROM/RAM, a hard disk, or an optical disc, and includes several instructions for instructing a computer device (which may be a personal computer, a server, a network device, or the like) to perform the methods in all or some of the embodiments.

While the present application has been described with reference to the preferred embodiments, various modifications can be made, and equivalents can be provided to substitute for the components thereof without departing from the scope of the present application. In particular, the technical features mentioned in the embodiments can be combined in any manner, provided that there is no structural conflict. The present application is not limited to the specific embodiments disclosed herein but includes all the technical solutions that fall within the scope of the claims.

What is claimed is:

1. A heating circuit for a battery, wherein the battery comprises a first battery bank and a second battery bank, and the heating circuit comprises:
    a switch module, wherein the switch module is connected to each of the first battery bank and the second battery bank;
    a heating module, wherein the heating module is connected to each of the first battery bank, the second battery bank, and the switch module, respectively; and
    a control module, wherein the control module is connected to each of the switch module and the heating module, and the control module is configured to control the switch module to switch the battery to a heating state, and is configured to control the heating module when the battery is in the heating state, such that the first battery bank, the heating module, and the second battery bank form a loop;
    wherein the loop is used to transfer electricity between the first battery bank and the second battery bank, so as to heat the first battery bank and the second battery bank;
    wherein the switch module comprises a first switch and a second switch; and
    the first battery bank, the first switch, and the second battery bank are connected in series to form a first branch, a first terminal of the first branch is connected to the heating module, a second terminal of the first branch is connected to each of a first terminal of the second switch and the heating module, a connecting point between the first battery bank and the first switch is connected to a second terminal of the second switch, and a connecting point between the second battery bank and the first switch is connected to the heating module.

2. The heating circuit according to claim 1, wherein the control module is further configured to:
    control the first switch to be turned off, and control the second switch to be turned on, such that the battery is switched to the heating state.

3. The heating circuit according to claim 1, wherein
    the heating module comprises a self-heating excitation unit, and the self-heating excitation unit comprises a first bridge arm, a second bridge arm, a first capacitor, a second capacitor, and a first inductor;
    the first bridge arm and the first capacitor are connected in parallel to form a second branch, a first terminal of the second branch is connected to each of the switch module and the second battery bank, the second bridge arm and the second capacitor are connected in parallel to form a third branch, a first terminal of the third branch is connected to the first battery bank, a second terminal of the second branch is connected to a second terminal of the third branch, and the first inductor is connected between a midpoint of the first bridge arm and a midpoint of the second bridge arm; and
    the control module is connected to each of the first bridge arm and the second bridge arm, and the control module is further configured to: when the battery is in the heating state, control the first bridge arm and the second bridge arm to form a loop for the first battery bank to discharge towards the second battery bank, and/or form a loop for the second battery bank to discharge towards the first battery bank, so as to heat the first battery bank and the second battery bank.

4. The heating circuit according to claim 3, wherein
    the heating module further comprises a pre-charging unit, and the pre-charging unit is connected to each of the first capacitor, the second capacitor, the first battery bank, and the second battery bank; and
    the control module is connected to the pre-charging unit, and the control module is further configured to: control the pre-charging unit to be in a first working state, such that the first battery bank charges the first capacitor, and/or the second battery bank charges the second capacitor; and
    if a voltage across both terminals of the first capacitor is not less than a first voltage threshold, and a voltage across both terminals of the second capacitor is not less than a second voltage threshold, control the pre-charging unit to be in a second working state, so as to stop charging the first capacitor and the second capacitor.

5. The heating circuit according to claim 4, wherein
    the pre-charging unit comprises a third switch, a fourth switch, and a first resistor; and
    the third switch and the first resistor are connected in series to form a fourth branch, the fourth branch is connected in parallel to the fourth switch, a first terminal of the fourth branch is connected to each of the first capacitor and the second capacitor, and a second terminal of the fourth branch is connected to each of the first battery bank and the second battery bank.

6. The heating circuit according to claim 5, wherein the control module is further configured to:
control the third switch to be turned on, and control the fourth switch to be turned off, so as to control the pre-charging unit to be in the first working state; and
control the fourth switch to be turned on, and control the third switch to be turned off, so as to control the pre-charging unit to be in the second working state.

7. The heating circuit according to claim 4, wherein both the first terminal of the first branch and the second terminal of the first branch are used to connect to an external device, wherein the external device comprises a charging device and a power consuming device, and the control module is further configured to:
if a temperature of the first battery bank is not less than a first temperature threshold and a temperature of the second battery bank is not less than a second temperature threshold, control the first switch to be turned on, and control the second switch and the fourth switch to be turned off, such that the battery is switched to a usage state;
wherein when the battery is in the usage state, the battery is configured to discharge towards the power consuming device or be charged by the charging device.

8. The heating circuit according to claim 1, wherein
the heating circuit for a battery further comprises a first fuse module and a second fuse module; and
the first fuse module is connected to each of the first battery bank and the heating module, and the second fuse module is connected to each of the second battery bank, the heating module, and the switch module.

9. A battery, comprising:
a first battery bank and a second battery bank; and
the heating circuit according to claim 1,
wherein the heating circuit is connected to each of the first battery bank and the second battery bank, and the heating circuit for a battery is configured to heat the first battery bank and the second battery bank.

10. An electric vehicle, comprising a load and the battery according to claim 9, wherein the battery is configured to supply power to the load.

11. A control method performed by a heating circuit for a battery, wherein the battery comprises a first battery bank and a second battery bank, the heating circuit comprises a switch module and a heating module, the switch module is connected to each of the first battery bank and the second battery bank, and the heating module is connected to each of the first battery bank, the second battery bank, and the switch module; and wherein the method comprises:
controlling the switch module to switch the battery to a heating state; and
controlling the heating module when the battery is in the heating state, such that the first battery bank, the heating module, and the second battery bank form a loop;
wherein the loop is used to transfer electricity between the first battery bank and the second battery bank, so as to heat the first battery bank and the second battery bank;
wherein the switch module comprises a first switch and a second switch; and
a first terminal of a first branch formed by connecting the first battery bank, the first switch, and the second battery bank in series is connected to the heating module, a second terminal of the first branch is connected to each of a first terminal of the second switch and the heating module, and a connecting point between the first battery bank and the first switch is connected to a second terminal of the second switch.

12. The method according to claim 11, wherein the controlling the switch module to switch the battery to a heating state comprises:
if a heating request signal is received, controlling the first switch to be turned off, and controlling the second switch to be turned on, such that the battery is switched to a heating state.

13. The method according to claim 11, wherein
the heating module comprises a self-heating excitation unit, and the self-heating excitation unit comprises a first bridge arm, a second bridge arm, a first capacitor, a second capacitor, and a first inductor;
the first bridge arm and the first capacitor are connected in parallel to form a second branch, a first terminal of the second branch is connected to each of the switch module and the second battery bank, the second bridge arm and the second capacitor are connected in parallel to form a third branch, a first terminal of the third branch is connected to the first battery bank, a second terminal of the second branch is connected to a second terminal of the third branch, and the first inductor is connected between a midpoint of the first bridge arm and a midpoint of the second bridge arm; and
the controlling the heating module when the battery is in the heating state, such that the first battery bank, the heating module, and the second battery bank form a loop comprises:
controlling the first bridge arm and the second bridge arm to form a loop for the first battery bank to discharge towards the second battery bank, and/or form a loop for the second battery bank to discharge towards the first battery bank.

14. The method according to claim 13, wherein the heating module further comprises a pre-charging unit, and the pre-charging unit is connected to each of the first capacitor, the second capacitor, the first battery bank, and the second battery bank; and the method further comprises:
controlling the pre-charging unit to be in a first working state, such that the first battery bank charges the first capacitor, and/or the second battery bank charges the second capacitor; and
if a voltage across both terminals of the first capacitor is not less than a first voltage threshold, and a voltage across both terminals of the second capacitor is not less than a second voltage threshold, controlling the pre-charging unit to be in a second working state, so as to stop charging the first capacitor and the second capacitor.

15. The method according to claim 14, wherein
the pre-charging unit comprises a third switch, a fourth switch, and a first resistor; and
the third switch and the first resistor are connected in series to form a fourth branch, the fourth branch is connected in parallel to the fourth switch, a first terminal of the fourth branch is connected to each of the first capacitor and the second capacitor, and a second terminal of the fourth branch is connected to each of the first battery bank and the second battery bank.

16. The method according to claim 15, wherein the controlling the pre-charging unit to be in a first working state comprises:
controlling the third switch to be turned on, and controlling the fourth switch to be turned off, so as to control the pre-charging unit to be in the first working state.

17. The method according to claim 15, wherein the controlling the pre-charging unit to be in a second working state comprises:
   controlling the fourth switch to be turned on; and
   controlling the third switch to be turned off, so as to control the pre-charging unit to be in the second working state.

18. The method according to claim 11, wherein both the first terminal of the first branch and the second terminal of the first branch are used to connect to an external device, wherein the external device comprises a charging device and a power consuming device; and the method further comprises:
   if a temperature of the first battery bank is not less than a first temperature threshold and a temperature of the second battery bank is not less than a second temperature threshold, controlling the first switch to be turned on, and controlling the second switch to be turned off, such that the battery is switched to a usage state;
   wherein when the battery is in the usage state, the battery is configured to discharge towards the power consuming device or be charged by the charging device.

* * * * *